United States Patent [19]

Richter, Jr. et al.

[11] Patent Number: 4,517,459
[45] Date of Patent: May 14, 1985

[54] TEMPERATURE STABILIZATION SYSTEM FOR A RADIATION DETECTOR IN A WELL LOGGING TOOL

[75] Inventors: Albert P. Richter, Jr.; Harold E. Peelman, both of Houston, Tex.

[73] Assignee: Texaco Inc., White Plains, N.Y.

[21] Appl. No.: 317,039

[22] Filed: Nov. 2, 1981

[51] Int. Cl.³ .............................................. G01V 5/00
[52] U.S. Cl. ..................................................... 250/261
[58] Field of Search ................................. 250/256, 261

[56] References Cited

U.S. PATENT DOCUMENTS

| | | | |
|---|---|---|---|
| 3,038,074 | 6/1962 | Scherbatskoy | 250/261 |
| 3,265,893 | 8/1966 | Rabson et al. | 250/261 |
| 4,199,953 | 4/1980 | Richter, Jr. et al. | 250/261 |

Primary Examiner—Janice A. Howell
Attorney, Agent, or Firm—Robert A. Kulason; Ronald G. Gillespie

[57] ABSTRACT

A temperature stabilization system for a radiation detector in a well logging tool includes a temperature sensor which senses the temperature and provides a corresponding signal. Apparatus located within the logging tool and containing the radiation detector provides a controllable temperature environment for the radiation detector. A heat exchanger transfers heat from the apparatus in accordance with the temperature signal so as to stabilize the temperature in the apparatus for the radiation detector. A heat disposing device is arranged with the heat exchanger to dispose of the transferred heat.

8 Claims, 3 Drawing Figures 4,517,459

TEMPERATURE STABILIZATION SYSTEM FOR A RADIATION DETECTOR IN A WELL LOGGING TOOL

BACKGROUND OF THE INVENTION

1. Field of the Invention

The present invention relates to a well logging tool in general and, more particularly, to well logging tools using cooling to prevent heat problems.

2. Descritpion of the Prior Art

Heretofore efforts to maintain a cool environment for a radiation detector in a well logging tool utilized a vacuum bottle containing the radiation detector and packed with ice. The present invention distinguishes over the prior art temperature stabilization of a well logging tool by providing for a heat exchanger to transfer heat from around the radiation detector to a heat disposing unit which may either radiate heat back into the borehole, or absorb the heat for later discharge at the surface.

A heat exchanger for temperature control of a radiation detector was used in monitoring crude oil flowing in a pipe line between an oil well and a storage tank as disclosed and described in U.S. Pat. No. 4,245,479. The aforementioned patent was issued to the inventors of the present invention and assigned to Texaco Inc., assignee of the present invention. The present invention distinguishes over the aforementioned patent in being restricted to a well logging tool impressed thereon. As can be seen in the aforementioned patent, there appear to be no such constraints. Further, it is well known in the field that crude oil flowing in a pipe is at a much greater temperature than the atmosphere surrounding the pipe and that heat may be exchanged to the atmosphere. The present invention provides for the removal of the heat and fed back into a borehole environment, which is originally the source of the problem, and further, if so desired, to have a self-contained heat disposing means.

SUMMARY OF THE INVENTION

A temperature stabilization system for a radiation detector in a well logging tool comprising a temperature sensor providing a temperature signal corresponding to the temperature in the well logging tool. A housing provides a controllable temperature environment for the radiation detector located within the housing. A heat exchanger transfers the heat from the housing in accordance with the temperature signal so as to stabilize the temperature in the housing for the radiation detector. Apparatus cooperates with the heat exchanger to dispose of the transferred heat from the heat exchanger.

The objects and advantages of the invention will appear more fully hereinafter from a consideration of the detailed description which follows, taken together with the accompanying drawings wherein two embodiments of the invention are illustrated by way of example. It is expressly understood, however, that the drawings are for illustration purposes only and are not to be construed as defining the limits of the invention.

DESCRIPTION OF THE DRAWINGS

Referring now to FIG. 1, there is shown a portion of a well logging tool 1 having a vacuum bottle 5 mounted therein. Enclosed in vacuum bottle 5 is a typical radiation detector assembly including a sodium-iodide crystal 8 coupled with a photomultiplier tube 10 whose output is amplified by an amplifier 12. A pipe 6 is coupled with a thermal electric cooler 18, which is also connected to a radiator section 20. Radiator section 20 includes a plurality of fins (not shown) and is connected as an integral part of well logging tool 1 by threads 19 and appropriate seals 20. Thermal electric cooler 18, of a conventional type to transfer heat from one surface to another surface, is controlled by a temperature control 27 and a thermistor 29.

In operation, thermistor 29 senses the temperature inside vacuum flask 5 and provides this information to temperature controller 27. Referring now to FIG. 2, thermistor 29, which is part of a bridge circuit 33 in temperature controller 27, varies in resistance according to the temperature in vacuum bottle 5. Bridge circuit 33 provides a temperature signal, in accordance with the resistance value of thermistor 29, to a power source 36. Power source 36 is responsive to the temperature signal to provide a corresponding control current to thermal electric cooler 18 so as to control the heat being transferred by thermal electric cooler 18. Thus, as thermistor 29 responds to an increase in temperature, thermal electric cooler 18 is controlled to increase the heat transfer rate from heat pipe 6 to radiator 20. In essence, the temperature inside logging tool 1 is sensed and the heat transfer function of thermal electric cooler 18 is controlled in accordance with the sensed temperature.

Figure 1:
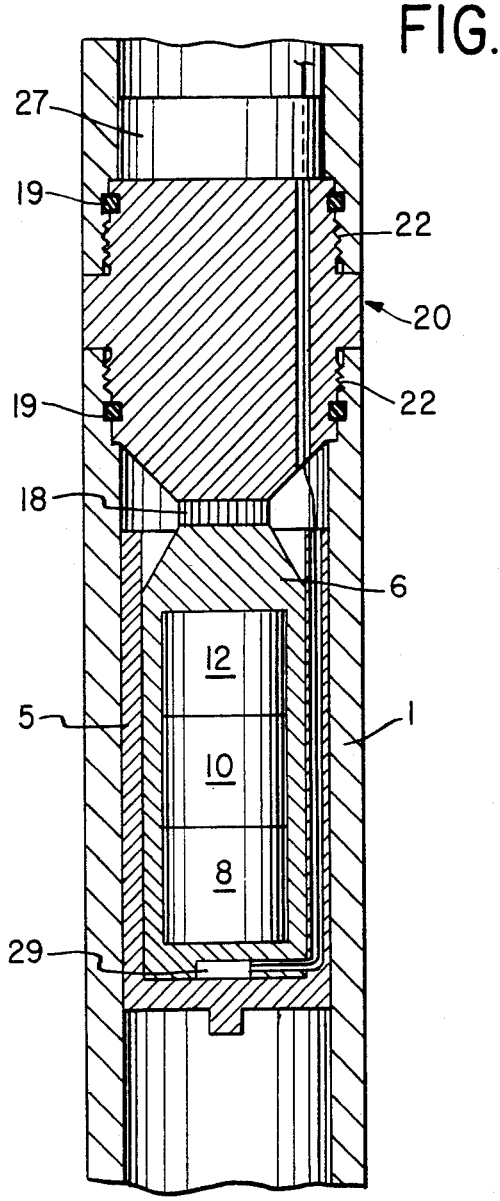
FIG. 1 is a drawing of a portion of a nuclear well logging tool containing a radiation detector therein and a temperature stabilization system for the radiation detector, constructed in accordance with the present invention.
Figure 3:
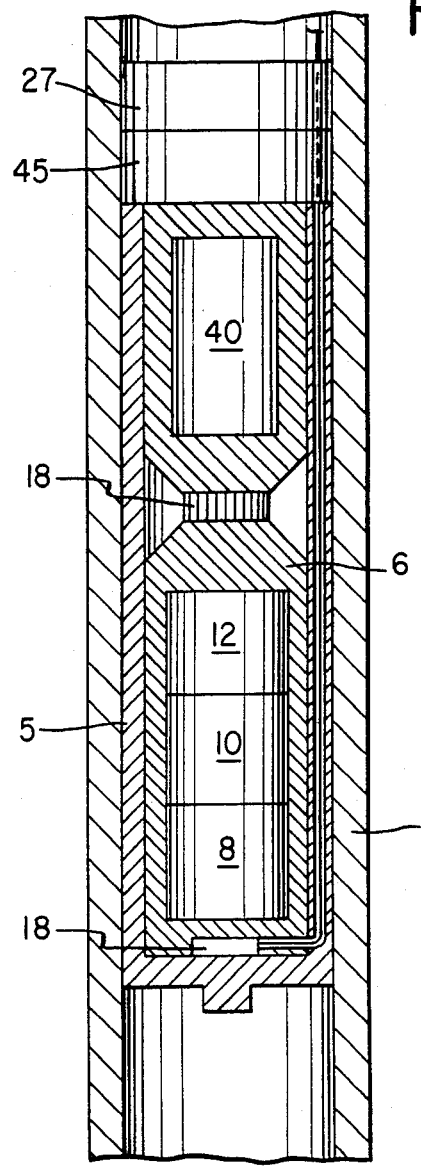
FIG. 3 shows another embodiment of a temperature stabilization system, constructed in accordance with the present invention, for a radiation detector in a nuclear well logging tool.
Figure 2:
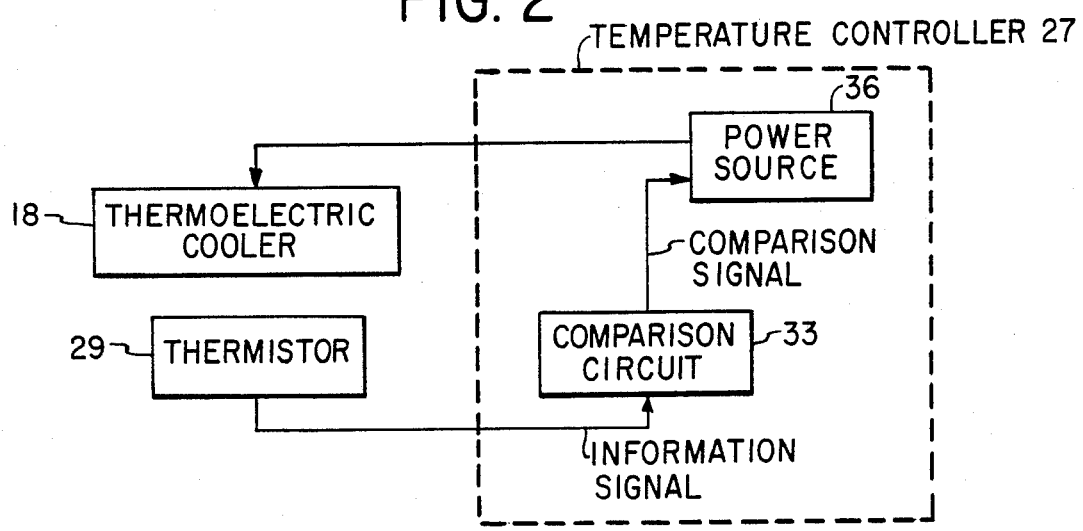
FIG. 2 is a simplified blocked diagram of the temperature controller shown in FIG. 1 cooperating with the thermal electric cooler and the thermistor also shown in FIG. 1.

In another embodiment of the present invention, vacuum bottle 5 is enlarged to include a cannister 40. Cannister 40 replaces radiator section 20 of the FIG. 1 embodiment and contains a phase change material. Preferably, the phase change material is a material that changes phase at a temperature above room temperature. Such a material is sodium hydrogen phosphate dodecahydrate ($Na_2 HPO_4.12 H_2O$) which has a melting temperature of 97° F. The aforementioned material is preferred because it freezes after use at room temperature and thus requires no separate freezer equipment for reuse; nor, would it then be necessary to remove cannister 40 from logging tool 1 to freeze the phase change material. The embodiment of FIG. 3 further differs from the embodiment of FIG. 1 by having an insulator 45 closing off the one end of the vacuum bottle 5 and separating it from temperature controller 27.

The present invention as hereinbefore described is a temperature stabilization system for radiation detectors in well logging tools.

What is claimed is:

1. A temperature stabilization system for a radiation detector in a well logging tool comprising means for sensing the temperature in a well logging tool and providing a corresponding temperature signal, means located within said logging tool and containing the radiation detector tool for providing a controllable temperature environment for the radiation detector, means responsive to the temperature signal for transferring heat from the environment means so as to stabilize the temperature in the environment means for the radiation detector, and means for disposing of transferred heat from the heat transfer means 2. The system as described in claim 1 in which the environment means includes a vacuum bottle which houses the radiation detector, and a heat pipe arranged to cooperate with the vacuum bottle so that the ambient heat around the radiation detector is provided to the heat transfer means.

3. The system as described in claim 2 in which the heat disposing means radiates transferred heat into the borehole.

4. A system as described in claim 1 in which the environment means is a vacuum bottle in which the radiation detector is located, and the heat disposing means is located within the vacuum bottle.

5. A system as described in claim 4 in which the heat disposing means includes a cannister arranged with the heat transfer means, and phase change material within the cannister which absorbs the transferred heat.

6. A system as described in claim 5 in which the phase change material is preferably a material that changes phase at a temperature above room temperature.

7. A system as described in claim 6 in which phase change material is sodium hydrogen phosphate dodecahydrate.

8. A system as described in claim 3 or 5 in which the heat transfer means includes means for providing a control signal in accordance with the temperature signal, and a thermal electric cooler is arranged between the environment means and the heat disposing means which transfers heat in accordance with the control signal.

* * * * *